(12) United States Patent
Oji

(10) Patent No.: US 10,737,534 B2
(45) Date of Patent: Aug. 11, 2020

(54) TIRE

(71) Applicant: SUMITOMO RUBBER INDUSTRIES, LTD., Kobe-shi (JP)

(72) Inventor: Takuya Oji, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 278 days.

(21) Appl. No.: 15/840,049

(22) Filed: Dec. 13, 2017

(65) Prior Publication Data

US 2018/0162172 A1 Jun. 14, 2018

(30) Foreign Application Priority Data

Dec. 13, 2016 (JP) .................. 2016-241542

(51) Int. Cl.
*B60C 11/00* (2006.01)
*B60C 11/12* (2006.01)
(Continued)

(52) U.S. Cl.
CPC .......... *B60C 11/1218* (2013.01); *B60C 11/00* (2013.01); *B60C 11/03* (2013.01); *B60C 11/032* (2013.01); *B60C 11/0304* (2013.01); *B60C 11/0306* (2013.01); *B60C 11/04* (2013.01); *B60C 11/12* (2013.01); *B60C 11/1236* (2013.01); *B60C 11/1263* (2013.01); *B60C 11/1281* (2013.01); *B60C 11/13* (2013.01); *B60C 11/1353* (2013.01); *B60C 2011/0355* (2013.01); *B60C 2011/1209* (2013.01);
(Continued)

(58) Field of Classification Search
CPC . B60C 11/03; B60C 11/04; B60C 2011/0388; B60C 11/1353; B60C 2011/0381; B60C 2011/1361; B60C 11/0306; B60C 11/12; B60C 11/13
See application file for complete search history.

(56) References Cited

U.S. PATENT DOCUMENTS 3,637,001 A * 1/1972 Roberts ............... B60C 11/0306
152/209.17
2010/0200138 A1* 8/2010 Shibano .................. B60C 11/12
152/209.25
(Continued)

FOREIGN PATENT DOCUMENTS

FR 1301402 A * 8/1962 ........... B60C 11/032
JP 2008-056111 A 3/2008
(Continued)

*Primary Examiner* — Robert C Dye
*Assistant Examiner* — Debjani Roy
(74) *Attorney, Agent, or Firm* — Oblon, McClelland, Maier & Neustadt, L.L.P.

(57) ABSTRACT

A tire includes a tread part having main grooves each continuously extending in a tire circumferential direction, and land portions demarcated by the main grooves. The tread part has a tread surface, each of the land portions has slots formed such that each of the slots is recessed from the tread surface and extending from a first end to a second end in a curve forming an arc shape, and each of the slots has an opening edge on the tread surface such that the opening edge is forming a crescent shape that is gradually increased in width from the first end and the second end toward a longitudinal direction central portion of each of the slots.

20 Claims, 7 Drawing Sheets

US 10,737,534 B2

Page 2

(51) Int. Cl.
  *B60C 11/03* (2006.01)
  *B60C 11/13* (2006.01)
  *B60C 11/04* (2006.01)
(52) U.S. Cl.
  CPC ................ *B60C 2011/1254* (2013.01); *B60C 2011/1361* (2013.01)

(56) References Cited

U.S. PATENT DOCUMENTS

2011/0192513 A1* 8/2011 Hamada ................ B60C 3/04
  152/209.18
2013/0048170 A1* 2/2013 Inoue ................ B60C 11/032
  152/209.15

FOREIGN PATENT DOCUMENTS

JP  2010-179827 A  8/2010
WO  WO-2015129139 A1 *  9/2015

* cited by examiner

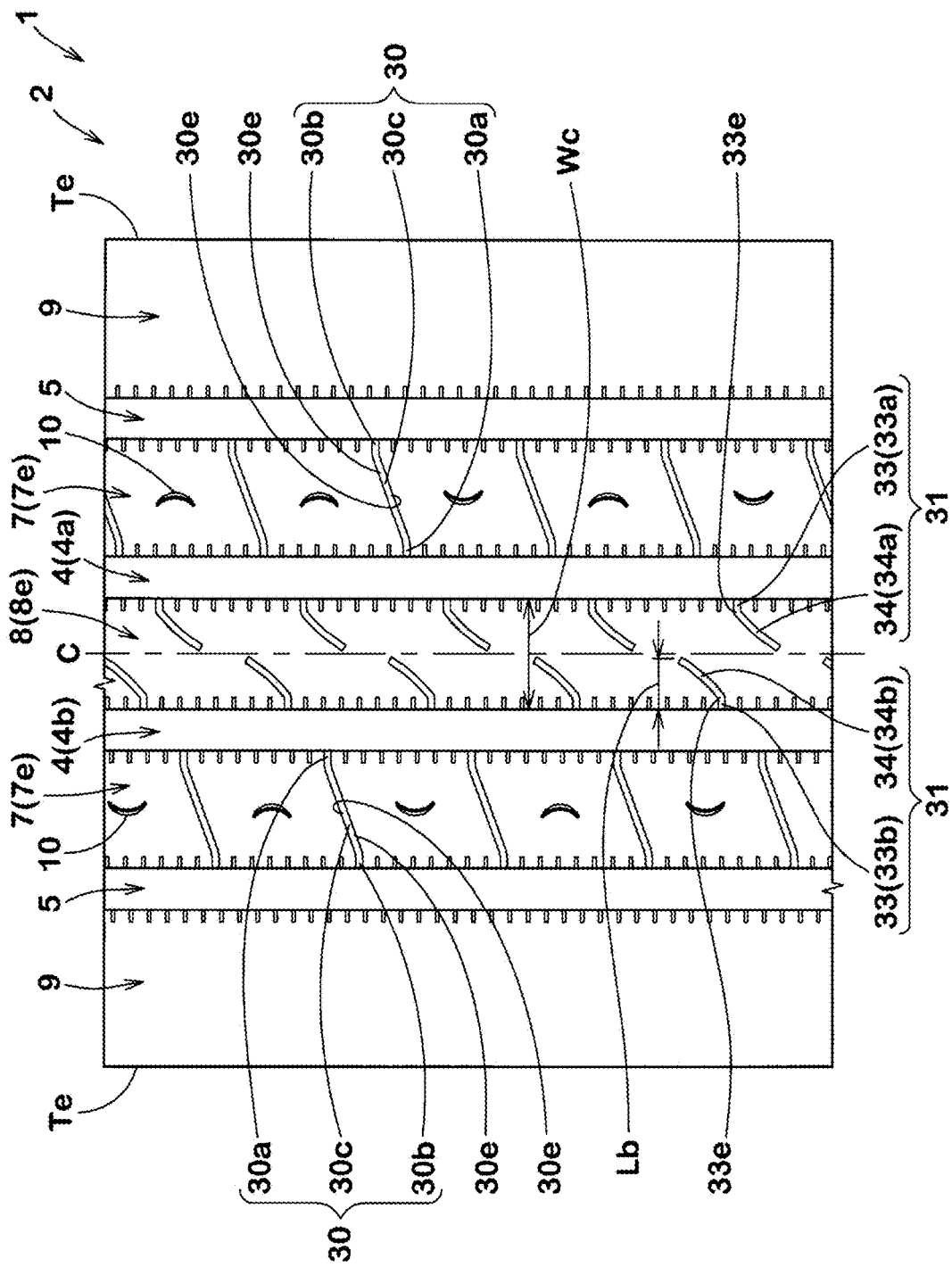

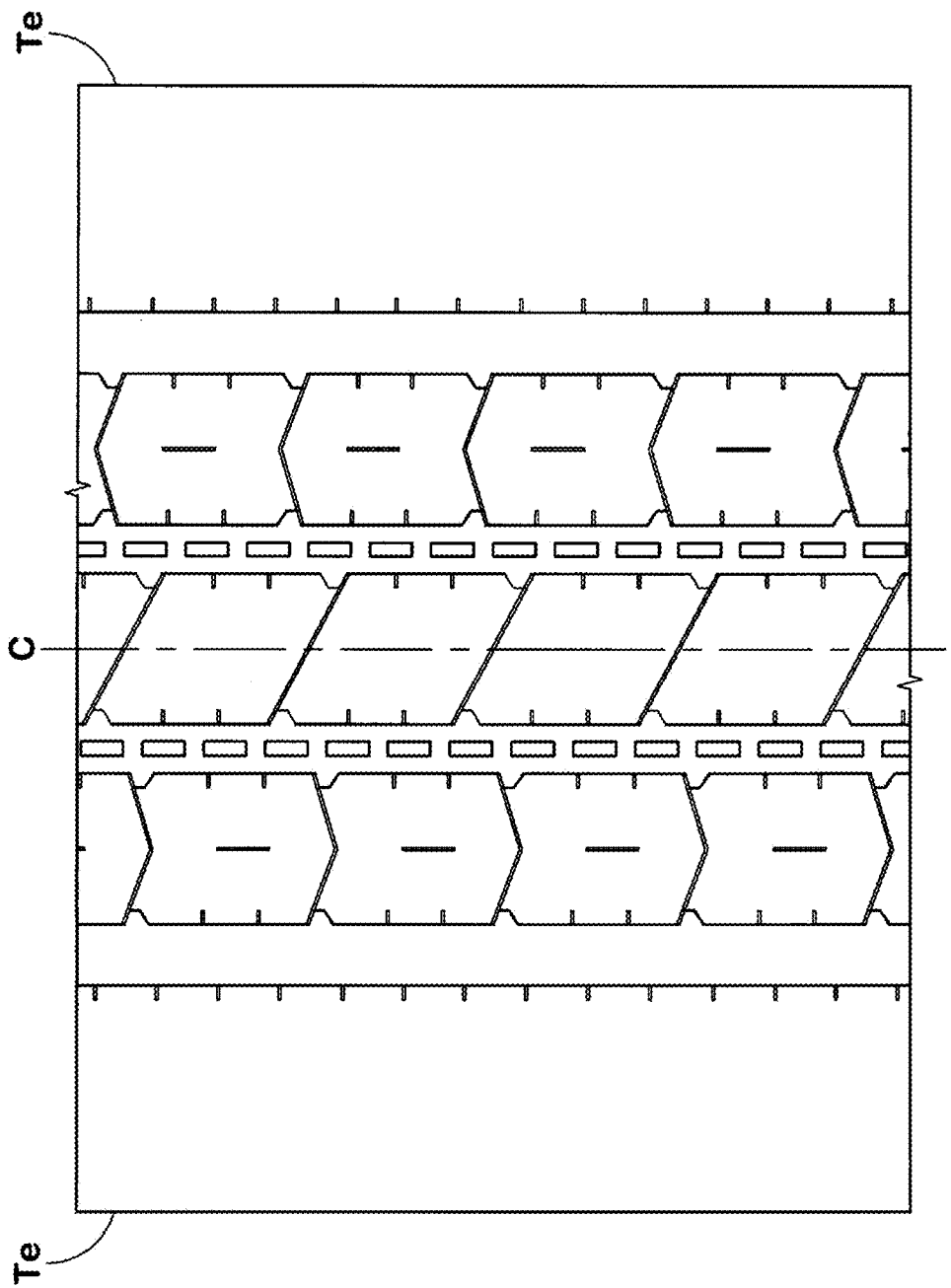

TIRE

CROSS-REFERENCE TO RELATED APPLICATIONS

The present application is based upon and claims the benefit of priority to Japanese Patent Application No. 2016-241542, filed Dec. 13, 2016, the entire contents of which are incorporated herein by reference.

BACKGROUND OF THE INVENTION

Field of the Invention

The present invention relates to a tire that allows wet performance and uneven wear resistance to be improved in a well-balanced manner.

Description of Background Art

A tire may have groove-like bodies each having a small width in land portions of a tread part. Japanese Patent Laid-Open Publication No. 2010-179827 and Japanese Patent Laid-Open Publication No. 2008-56111 describe related technologies. The entire contents of these publications are incorporated herein by reference.

SUMMARY OF THE INVENTION

According to one aspect of the present invention, a tire includes a tread part having main grooves each continuously extending in a tire circumferential direction, and land portions demarcated by the main grooves. The tread part has a tread surface, each of the land portions has slots formed such that each of the slots is recessed from the tread surface and extending from a first end to a second end in a curve forming an arc shape, and each of the slots has an opening edge on the tread surface such that the opening edge is forming a crescent shape that is gradually increased in width from the first end and the second end toward a longitudinal direction central portion of each of the slots.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a developed view of a tread part of another embodiment; and

FIG. 7 is a developed view of a tread part of a comparative example.

DETAILED DESCRIPTION OF THE EMBODIMENTS

Figure 1:
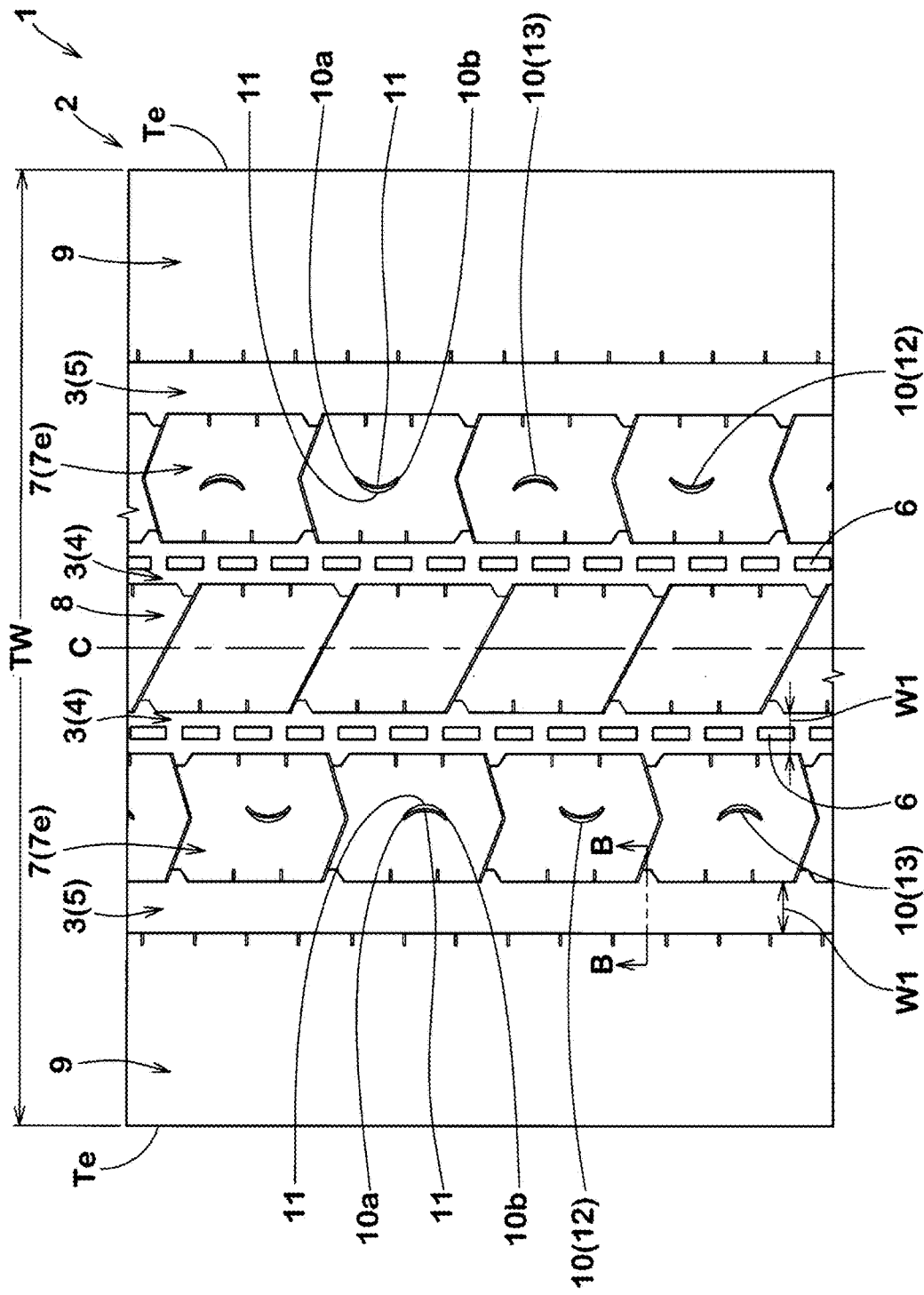
FIG. 1 is a developed view of a tread part illustrating an embodiment of the present invention.

Embodiments will now be described with reference to the accompanying drawings, wherein like reference numerals designate corresponding or identical elements throughout the various drawings.

FIG. 1 is a developed view of a tread part 2 of a tire 1 illustrating an embodiment of the present invention. The present invention may be applied, for example, for various tires such as a pneumatic tire for a passenger car or a vehicle for a heavy load, and for a non-pneumatic tire that is not filled with pressurized air. The tire 1 of the present embodiment is a pneumatic tire for a heavy load.

In the tread part 2, multiple main grooves 3 continuously extending in a tire circumferential direction are formed. In the present embodiment, the main grooves 3 include a pair of crown main grooves (4, 4) that are respectively formed on both sides of a tire equator (C), and a pair of shoulder main grooves (5, 5) that are each formed between a crown main groove 4 and a tread edge (Te).

A "tread edge" (Te) is defined as a ground contact position of a tire axial direction outermost side when the tire 1 in a normal state, in which the tire 1 is mounted to a normal rim and is filled with air at a normal internal pressure and is loaded with no load, is loaded with a normal load and is grounded on a flat surface at an camber angle of 0 degree. In the normal state, a tire axial direction distance between the two tread edges (Te, Te) is defined as a tread width (TW). Unless otherwise specified, values of dimensions and the like of the parts of the tire are values measured in the internal state.

The term "normal rim" refers to a rim for which standards are set for each tire in a system of standards that includes standards on which the tire is based. For example, the "normal rim" refers to a "Standard Rim" in the JATMA standards, a "Design Rim" in the TRA standards, or a "Measuring Rim" in the ETRTO standards.

The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards. When the tire is for a passenger car, the normal internal pressure is 180 kPa.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards. When the tire is for a passenger car, the normal load is a load corresponding to 88% of the above-described load.

The crown main grooves 4 and the shoulder main grooves 5 each linearly extend. Such main grooves 3 can effectively drain water in the grooves backward in a traveling direction when traveling on a wet road surface and thus can achieve excellent wet performance.

Each of the crown main grooves 4 of the present embodiment has multiple projections 6 aligned in the tire circumferential direction at a groove bottom of the groove. Such projections 6 suppress deformation of the crown main grooves 4 and ensure a high rigidity of land portions adjacent to the crown main grooves 4, and thus, improve uneven wear resistance.

The main grooves 3 desirably each have a groove width (W1) of, for example, 2%-8% of the tread width (TW). Further, the main grooves 3 desirably each have a groove depth (D1) (illustrated in FIG. 4) of, for example, about 10-20 mm.

In the tread part 2, a pair of middle land portions (7, 7) that are each demarcated by a crown main groove 4 and a shoulder main groove 5, one crown land portion 8 that is demarcated between the crown main grooves (4, 4), and a pair of shoulder land portions (9, 9) that are each demarcated by a shoulder main groove 5 and a tread edge (Te) are formed.

In each of the middle land portions 7 of the present embodiment, slots 10 recessed from a tread surface (7*e*) are formed. The slots 10 each have a first end (10*a*) and a second end (10*b*), which are two longitudinal direction ends. Further, the slots 10 each have opening edges 11 connecting the first end (10*a*) and the second end (10*b*) on the tread surface (7*e*). In the present embodiment, the opening edges 11 are each curved in an arc shape extending from the first end (10*a*) to the second end (10*b*). Such opening edges 11 can disperse load acting on the middle land portions 7 in multiple directions of a tire axial direction and thus, an apparent rigidity of the middle land portions 7 can be increased. Therefore, occurrence of punching wear or the like can be suppressed. Further, the arc-shaped opening edges 11 each have a tire axial direction component and a tire circumferential direction component, and thus increase braking performance and skid resistance on a wet road, and improve wet performance.

Figure 2A:
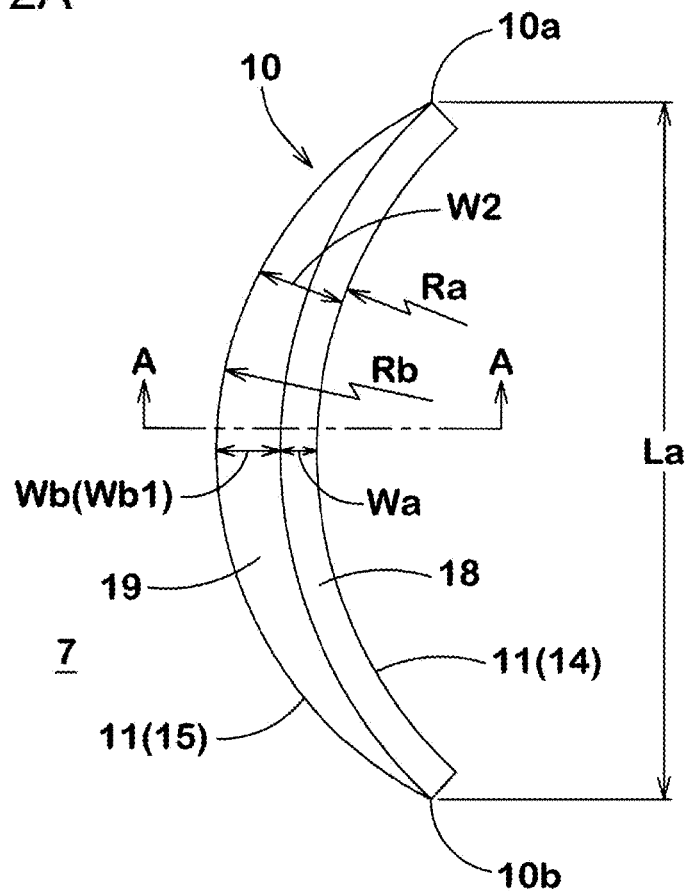
FIG. 2A is an enlarged view of a slot of FIG. 1.

FIG. 2A is an enlarged view of a slot 10. As illustrated in FIG. 2A, the slot 10 has a crescent shape in which a width (W2) of the slot 10 gradually increases from the first end (10*a*) and the second end (10*b*) of the opening edges 11 toward a longitudinal direction central portion of the slot 10. Opening edges (11, 11) on two sides of such a slot 10 have different curvature radii and thus can further disperse a load in multiple directions. Therefore, occurrence of punching wear or the like can be further suppressed.

In the present embodiment, the slot 10 is curved so as to project in the tire axial direction. Since the opening edges 11 of such a slot 10 can effectively disperse of a large lateral force that acts during turning, wear resistance is further improved.

As illustrated in FIG. 1, in the present embodiment, the slots 10 include first slots 12 that are convex toward one side of the tire axial direction, and second slots 13 that are convex toward an opposite direction of the first slots 12. As a result, tire axial direction forces acting on the opening edges 11 of the first slots 12 and the second slots 13 are canceled out. Therefore, braking performance and skid resistance on a wet road are further increased. In the present embodiment, the first slots 12 and the second slots 13 are alternately formed in the tire circumferential direction, and thus, the above effect is more effectively achieved.

As illustrated in FIG. 2A, the opening edges 11 include a first arc-shaped edge 14 and a second arc-shaped edge 15 that each extend in an arc shape between the first end (10*a*) and the second end (10*b*). The slot 10 includes a first portion 18 formed on the first arc-shaped edge 14 side and a second portion 19 formed on the second arc-shaped edge 15 side. In the present embodiment, the first portion 18 has a larger depth than the second portion 19. As a result, a larger frictional force is achieved due to the opening edge 11 of the first portion 18, and thus, wet performance is improved. The second portion 19 maintains the rigidity of the middle land portions 7, and improves uneven wear resistance.

In the present embodiment, a curvature radius (Ra) of the first arc-shaped edge 14 is formed larger than a curvature radius (Rb) of the second arc-shaped edge 15. That is, in a plan view, the second portion 19 is formed on a convex side of the first portion 18. In such a slot 10, the rigidity on the second portion 19 side (where the rigidity is likely to be reduced since the curvature radius (Rb) is small) of the middle land portions 7 and the rigidity on the first portion 18 side (where the rigidity is likely to be maintained high since the curvature radius (Ra) is large) of the middle land portions 7 are equalized. Therefore, uneven wear resistance is improved. When the curvature radius (Ra) of the first arc-shaped edge 14 is formed smaller than the curvature radius (Rb) of the second arc-shaped edge 15, that is, when the first portion 18 is formed on a convex side of the second portion 19, a frictional force due to a tire axial direction component of the first arc-shaped edge 14 is increased. Therefore, braking performance on a wet road is improved.

A width (Wa) of the first portion 18 in a direction orthogonal to the first arc-shaped edge 14 is desirably smaller than a width (Wb) of a portion of the second portion 19 orthogonal to the second arc-shaped edge 15. As a result, a difference in groove volume between the first portion 18 having a larger depth and the second portion 19 having a smaller depth can be maintained small. Therefore, the rigidity on the second portion 19 side of the middle land portions 7 and the rigidity on the first portion 18 side of the middle land portions 7 can be further equalized. A width (Wa) of the first portion 18 and a width (Wb) of the second portion 19 are each specified as an average width over a length of the slot 10. Further, the width (Wa) of the first portion 18 is specified in a region on a tire radial direction inner side of the second portion 19.

In order to effectively achieve the above-described effect, a maximum groove width (Wb1) of the second portion 19 is desirably 0.04-0.06 times a tire axial direction width (Wm) (illustrated in FIG. 3) of the middle land portions 7. When the maximum groove width (Wb1) of the second portion 19 is less than 0.04 times the width (Wm) of the middle land portions 7, the difference between the curvature radius (Ra) of the first arc-shaped edge 14 and the curvature radius (Rb) of the second arc-shaped edge 15 becomes small and a load cannot be dispersed in multiple directions, and thus, there is a risk that uneven wear resistance cannot be increased. When the maximum groove width (Wb1) of the second portion 19 exceeds 0.06 times the width (Wm) of the middle land portions 7, there is a risk that the rigidity on the second arc-shaped edge 15 side of the middle land portions 7 may decrease. In the present embodiment, the maximum groove width (Wb1) of the second portion 19 is formed in a range of 45%-55% of a length (La) between the first end (10*a*) and the second end (10*b*) of the slot 10 from the first end (10*a*) of the slot 10.

From the same point of view, the maximum groove width (Wb1) of the second portion 19 is desirably 0.10-0.17 times the length (La) of the slot 10.

In the present embodiment, the tire axial direction width (Wm) of the middle land portions 7 is desirably 13%-16% of the tread width (TW) (illustrated in FIG. 1).

The width (Wa) of the first portion 18 is desirably 0.2-1 mm. When the width (Wa) of the first portion 18 is less than 0.2 mm, there is a risk that occurrence of punching wear or the like starting from the first end (10*a*) or the second end (10b) cannot be suppressed. When the width (Wa) of the first portion 18 exceeds 1 mm, there is a risk that the volume of the first portion 18 is increased and the rigidity on the first portion 18 side of the middle land portions 7 is decreased.

From a point of view of enhancing the above-described effect, the length (La) of the slot 10 is desirably 24%-48% of the tire axial direction width (Wm) of the middle land portions 7.

A ratio (Ra/Rb) of the curvature radius (Ra) of the first arc-shaped edge 14 to the curvature radius (Rb) of the second arc-shaped edge 15 is desirably, for example, about 1.05-1.20. When the ratio (Ra/Rb) is less than 1.05, the above-described directions in which a load is dispersed are limited and thus, there is a risk that uneven wear resistance cannot be effectively increased. When the ratio (Ra/Rb) exceeds 1.20, there is a risk that the curvature radius (Rb) of the second arc-shaped edge 15 may become excessively small and the rigidity on the second arc-shaped edge 15 side of the middle land portions 7 may be greatly decreased. Further, when the ratio (Ra/Rb) exceeds 1.20, there is a risk that the first arc-shaped edge 14 may become nearly linear and it may be impossible to disperse a load in multiple directions.

From a point of view of effectively enhancing the above-described effect, the curvature radius (Ra) of the first arc-shaped edge 14 is desirably 0.20-0.26 times the tire axial direction width (Wm) of the middle land portions 7.

Figure 2B:
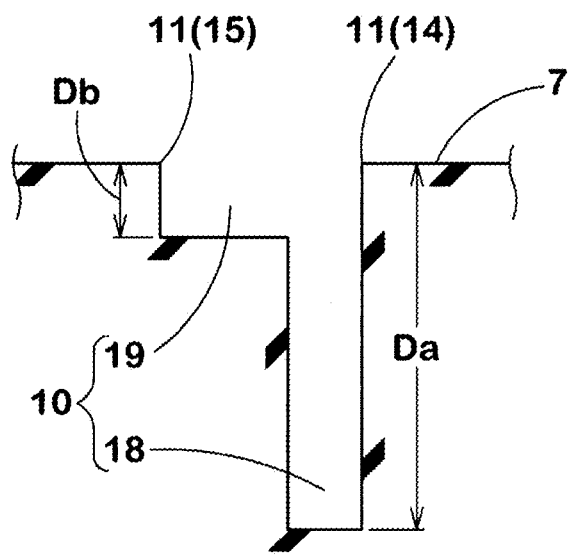
FIG. 2B is a cross-sectional view along an A-A line of FIG. 1A.

As illustrated in FIG. 2B, the depth (Da) of the first portion 18 is desirably 0.40-0.46 times the groove depth (D1) (illustrated in FIG. 4) of the main grooves 3. When the depth (Da) of the first portion 18 is less than 0.40 times the groove depth (D1) of the main grooves 3, there is a risk that the rigidity on the first arc-shaped edge 14 side of the middle land portions 7 may become excessively large. When the depth (Da) of the first portion 18 exceeds 0.46 times the groove depth (D1) of the main grooves 3, there is a risk that the rigidity on the first arc-shaped edge 14 side of the middle land portions 7 may become small.

From a point of view of effectively enhancing the above-described effect, the groove depth (Db) of the second portion 19 is desirably 0.05-0.14 times the groove depth (D1) of the main grooves 3.

Figure 3:
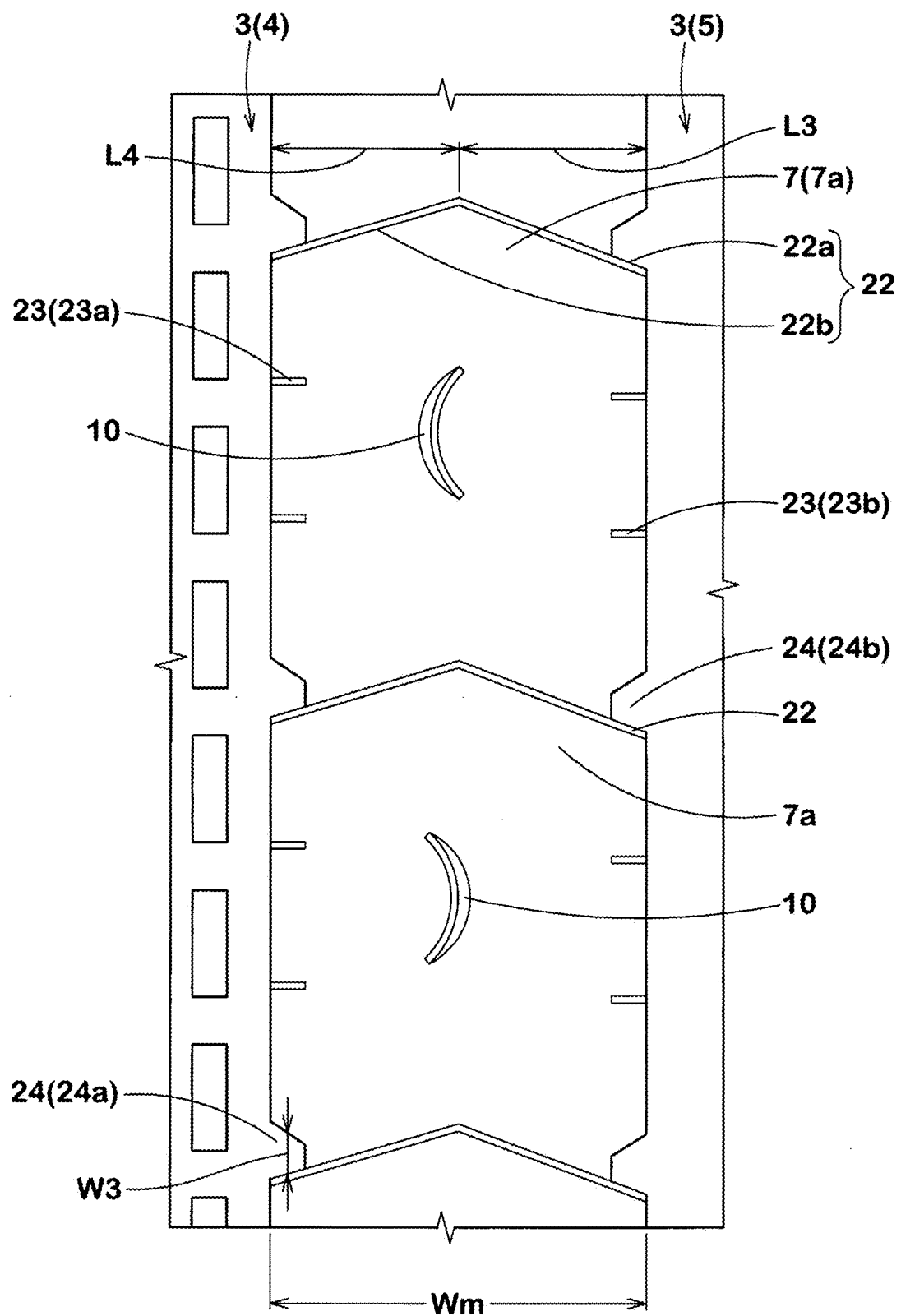
FIG. 3 is an enlarged view of a middle land portion of FIG. 1.

As illustrated in FIG. 3, in each of the middle land portions 7 of the present embodiment, multiple middle sipes 22, multiple middle lug sipes 23, and multiple middle lug grooves 24 are formed. The middle sipes 22 each connect a crown main groove 4 and a shoulder main groove 5. The middle lug sipes 23 each communicatively connect to a main groove 3 and terminate within a middle land portion 7. The middle lug grooves 24 each communicatively connect to a main groove 3 and terminate within a middle land portion 7. Such sipes (22, 23) and lug grooves 24 improve wet performance by scratching forces of edges or groove edges thereof. In the present specification, a "sipe" is defined as a slit having a width of less than 2 mm, and a "groove" is defined as groove-like body having a groove width of 2 mm or more.

In each of the middle land portions 7, middle block pieces (7a) that are demarcated by the multiple middle sipes 22 are formed in the tire circumferential direction.

In each of the middle block pieces (7a) of the present embodiment, one slot 10 is formed. Such middle block pieces (7a) allow the rigidity of the middle land portions 7 to be maintained high, and improve uneven wear resistance. In order to effectively achieve such an effect, it is desirable that the slots 10 be respectively formed in tire axial direction central portions of the middle block pieces (7a) and tire circumferential direction central portions of the middle block pieces (7a).

In the present embodiment, the middle sipes 22 each include a first sipe portion (22a) and a second sipe portion (22b). In the present embodiment, the first sipe portion (22a) extends from a shoulder main groove 5 toward a crown main groove 4 side and is inclined to one side with respect to the tire axial direction. In the present embodiment, the second sipe portion (22b) connects the first sipe portion (22a) and a crown main groove 4 and is inclined in an opposite direction to the first sipe portion (22a).

It is desirable that tire axial direction widths (L3, L4) of the first sipe portion (22a) and the second sipe portion (22b) are substantially equal to each other. Such middle sipes 22 allow tire axial direction forces acting on the first sipe portion (22a) and the second sipe portion (22b) to be canceled out. Therefore, braking performance on a wet road is improved.

In the present embodiment, the middle lug sipes 23 each extend along the tire axial direction. Such middle lug sipes 23 increase braking performance on a wet road.

The middle lug sipes 23 include inner side middle lug sipes (23a) that communicatively connect to a crown main groove 4 and outer side middle lug sipes (23b) that communicatively connect to a shoulder main groove 5. Such middle lug sipes 23 allow rigidity balance on both sides of the tire axial direction of the middle block pieces (7a) to be maintained, and increase frictional forces due to edges and improve uneven wear resistance and wet performance.

In the present embodiment, the middle lug grooves 24 each have a tire circumferential direction groove width (W3) that is gradually increased toward a main groove 3 side. Such middle lug grooves 24 allow water in the middle lug grooves 24 to be smoothly drained to the main grooves 3.

In the present embodiment, the middle lug grooves 24 are formed side by side with the middle sipes 22 along the tire circumferential direction. Such middle lug grooves 24 allow water adsorbed in the middle sipes 22 to be smoothly drained to the main grooves 3. Therefore, wet performance is further improved.

The middle lug grooves 24 include inner side middle lug grooves (24a) that communicatively connect to a crown main groove 4 and outer side middle lug grooves (24b) that communicatively connect to a shoulder main groove 5. Such middle lug grooves 24 effectively improve wet performance.

Figure 4:
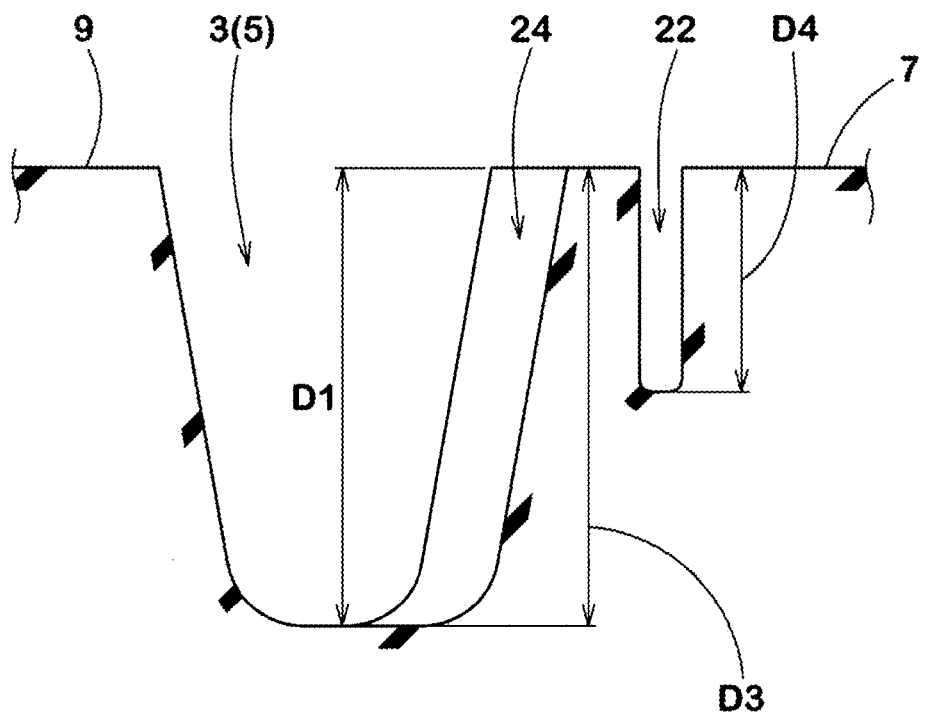
FIG. 4 is a cross-sectional view along a B-B line of FIG. 1.

Although not particularly limited, as illustrated in FIG. 4, a groove depth (D3) of each of the middle lug grooves 24 is desirably 80%-100% of the groove depth (D1) of each of the main grooves 3. Further, a depth (D4) of each of the middle sipes 22 is desirably 40%-60% of the groove depth (D1) of each of the main grooves 3.

Figure 5:
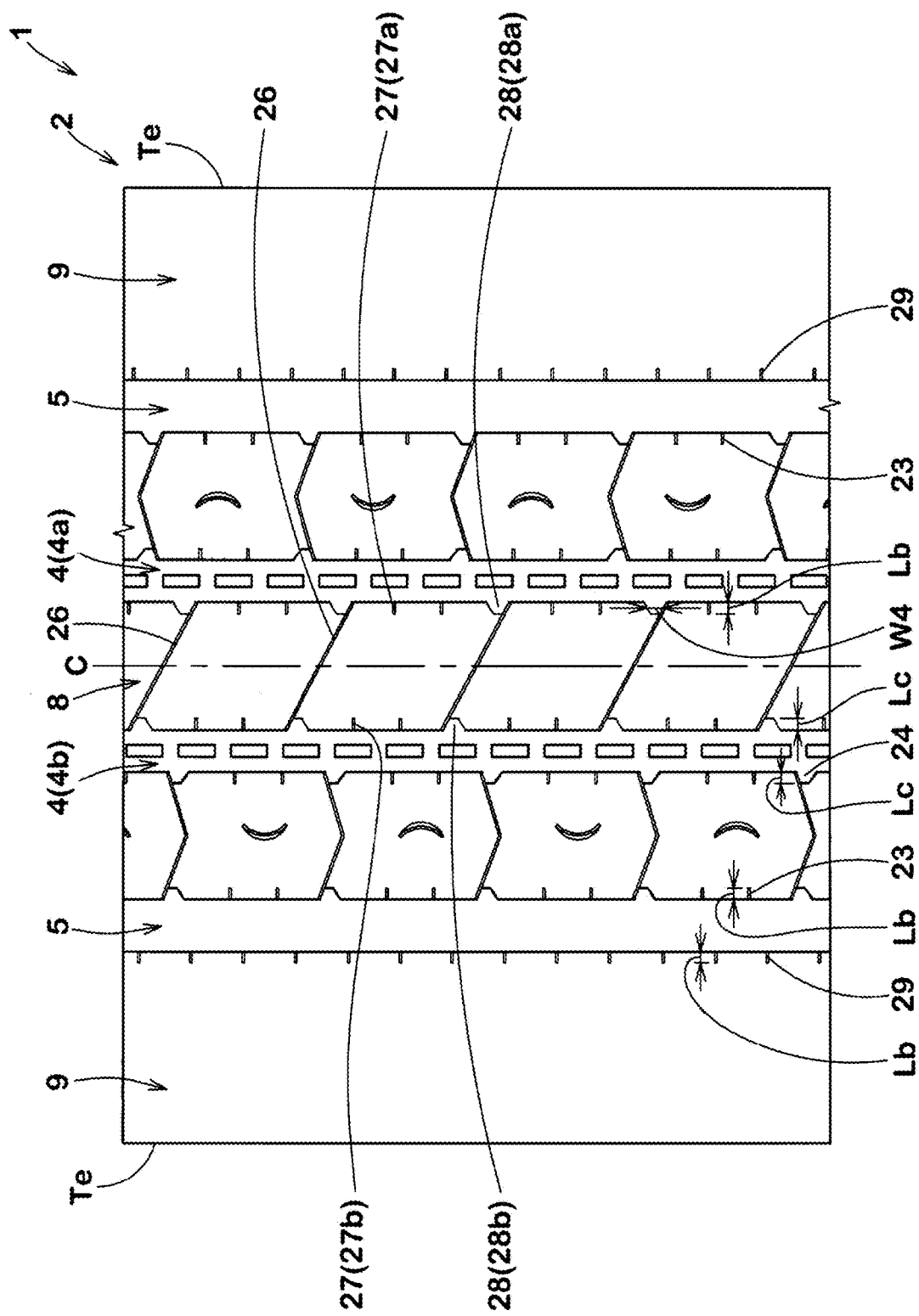
FIG. 5 is a developed view of a tread part illustrating an embodiment of the present invention.

As illustrated in FIG. 5, in the present embodiment, the crown land portion 8 includes multiple crown sipes 26, multiple crown lug sipes 27, and multiple crown lug grooves 28. In the present embodiment, the crown sipes 26 extend between the crown main grooves (4, 4). The crown lug sipes 27 each communicatively connect to a crown main groove 4 and terminate within the crown land portion 8. The crown lug grooves 28 each communicatively connect to a crown main groove 4 and terminate within the crown land portion 8.

In the present embodiment, the crown sipes 26 are inclined to one side with respect to the tire axial direction. Such crown sipes 26 each have a tire axial direction edge component and a tire circumferential direction edge component, and thus, improve wet performance.

In the present embodiment, the crown lug sipes 27 each extend along the tire axial direction. Such crown lug sipes 27 greatly improve braking performance on a wet road.

The crown lug sipes 27 of the present embodiment include first crown lug sipes (27a) that communicatively connect to a crown main groove (4a) on one side (right side in FIG. 5) and second crown lug sipes (27b) that communicatively connect to a crown main groove (4b) on the other side (left side in FIG. 5).

In the present embodiment, the crown lug grooves 28 each have a tire circumferential direction groove width (W4) that is gradually increased toward a crown main groove 4. Such crown lug grooves 28 allow water in the crown lug grooves 28 to be smoothly drained to the crown main grooves 4.

In the present embodiment, the crown lug grooves 28 are formed side by side with the crown sipes 26 along the tire circumferential direction. Such crown lug grooves 28 allow water adsorbed in the crown sipes 26 to be smoothly drained to the crown main grooves 4. Therefore, wet performance is improved.

The crown lug grooves 28 include first crown lug grooves (28a) that communicatively connect to the crown main groove (4a) on one side and second crown lug grooves (28b) that communicatively connect to the crown main groove (4b) on the other side. Such crown lug grooves 28 effectively improve wet performance.

In each of the shoulder land portions 9 of the present embodiment, shoulder lug sipes 29 are formed that communicatively connect to a shoulder main groove 5 and terminate within the shoulder land portion 9 and each extend along the tire axial direction. In the present embodiment, the shoulder lug sipes 29 each extend along the tire axial direction. Such shoulder lug sipes 29 further improve braking performance on a wet road.

In the shoulder land portions 9, sipes that each extend from a tread edge (Te) toward a tire axial direction inner side are not formed. Such shoulder land portions 9 allow the rigidity of the shoulder land portions 9 to be maintained high and thus allow excellent uneven wear resistance to be achieved.

A tire axial direction length (Lb) of each of the middle lug sipes 23, the crown lug sipes 27 and the shoulder lug sipes 29 is desirably 0.5%-2% of the tread width (TW). As a result, wet performance and uneven wear resistance are maintained in a well-balanced manner.

From the same point of view, a tire axial direction length (Lc) of each of the middle lug grooves 24 and the crown lug grooves 28 is desirably 0.5%-2% of the tread width (TW).

FIG. 6 illustrates a tread part 2 of another embodiment. The tread part 2 of this embodiment is also formed with a pair of middle land portions (7, 7), one crown land portion 8 and a pair of shoulder land portions (9, 9), which are demarcated by a pair of crown main grooves (4, 4) and a pair of shoulder main grooves (5, 5). In the middle land portions 7, the slots 10 illustrated in FIG. 1 are formed, and wet performance and uneven wear resistance are improved. In the following, only sipes and the like that are different from those of the tread part 2 illustrated in FIG. 1 are described. In the middle land portions 7 and the crown land portion 8 of this embodiment, sipes that each extend across one of the land portions (7, 8) are not formed.

As illustrated in FIG. 6, in the middle land portions 7 of this embodiment, middle transverse grooves 30 that each connect a crown main groove 4 and a shoulder main groove 5 are formed. Such middle transverse grooves 30 allow a water film of the tread surface (7e) of the middle land portions 7 to be smoothly drained to the crown main grooves 4 and the shoulder main grooves 5. In the middle land portions 7 of this embodiment, middle lug grooves are not formed.

In this embodiment, the middle transverse grooves 30 each include a first portion (30a) that extends from a crown main groove 4 toward an tire axial direction outer side, a second portion (30b) that extends from a shoulder main groove 5 toward a tire axial direction inner side, and a third portion (30c) that connects the first portion (30a) and the second portion (30b). The third portion (30c) is inclined at an angle larger than those of the first portion (30a) and the second portion (30b) with respect to the tire axial direction. Groove edges (30e) of such a third portion (30c) each have a tire axial direction component and a tire circumferential direction component, and thus, wet performance is improved. Further, the first portion (30a) and the second portion (30b) allow the tire circumferential direction rigidity of the middle land portions 7 to be maintained high.

In the crown land portion 8 of this embodiment, crown lug grooves 31 are formed that each communicatively connect to a crown main groove 4 and extend toward the tire equator (C) side. The crown lug grooves 31 each include, in a plan view, a linear portion 33 that linearly extends from a crown main groove 4, and an arc-shaped portion 34 that extends in an arc shape from an inner end (33e) of the linear portion 33. The linear portions 33 have a small drainage resistance in the grooves, and thus, wet performance is improved. Due to groove edges of the arc-shaped portions 34, braking performance and skid resistance on a wet road are improved.

The linear portions 33 each extend in the tire axial direction. In this embodiment, the linear portions 33 include first linear portions (33a) that each communicatively connect to the crown main groove (4a) on one side, and second linear portions (33b) that each communicatively connect to the crown main groove (4b) on the other side.

In this embodiment, the arc-shaped portions 34 include first arc-shaped portions (34a) that each communicatively connect to a first linear portion (33a), and second arc-shaped portions (34b) that each communicatively connect to a second linear portion (33b). The first arc-shaped portions (34a) and the second arc-shaped portions (34b) are formed to be convex in opposite directions in the tire circumferential direction. Therefore, due to groove edges of the arc-shaped portions, a load is further dispersed in multiple directions.

A tire axial direction length (Ld) of each of the crown lug grooves 31 is 35% or more and less than 50% of a tire axial direction length (Wc) of the crown land portion 8. Such crown lug grooves 31 allow a water film between a tread surface (8e) of the crown land portion 8 and a road surface to be smoothly drained and allow the rigidity of the crown land portion 8 to be maintained high.

In the above, a tire according to an embodiment of the present invention is described in detail. However, without being limited to the above-described specific embodiments, the present invention can also be embodied in various modified forms.

EXAMPLES

Tires each having a size of 295/75R22.5 and a basic pattern of FIG. 1 are prototyped based on specifications shown in Table 1, and wet performance and uneven wear resistance of each of the prototyped tires are tested. Common specifications and a test method of the prototyped tires are as follows.

Width of middle land portions, (Wm)/(TW): 13.5%
Width (Wa) of first portion: 0.6 mm
Groove depth (D1) of main grooves: 17.4 mm Braking Performance on Wet Road Prototyped tire are assembled on rims and are mounted on 8 wheels of a two-axis trailer pulled by a 2DD vehicle. On an asphalt road on which water is sprayed, sudden braking from a speed of 60 km/h is performed, and a braking distance from when the tires are locked to when the vehicle stopped is measured. As a result, an inverse number of each braking distance is obtained, and the result is expressed as an index number with a value of Comparative Example 1 as 100. A larger index number indicates a better braking performance on a wet road.

Rim: 22.5×8.25
Internal pressure: normal internal pressure
Load: normal load

Skid Resistance on Wet Road

On an asphalt road surface with a radius of 100 m, the above-described vehicle is driven on a course provided with a water puddle of 5 mm in water depth and 20 m in length while a speed of the vehicle is increased step by step, and an average lateral acceleration (lateral G) of front wheels of the vehicle at a speed of 50-80 km/h is calculated. The result is expressed as an index number with a lateral acceleration of Comparative Example 1 as 100. A larger index number indicates a better turning performance on a wet road.

Uneven Wear Resistance

The above-described vehicle is driven for 20,000 km on a test course of an asphalt road surface and wear amounts of the middle land portions are measured. The wear amounts are measured at six places along the tire circumferential direction on each of both side edges of each of the left and right middle land portions, and an average value (n=24) of the measured wear amounts is obtained. As a result, an inverse number of the average wear amount is obtained, and the result is expressed as an index number with a value of Comparative Example 1 as 100. A larger index number indicates a higher uneven wear resistance. The test results are shown in Table 1.

TABLE 1

|  | Comparative Example 1 | Example 1 | Example 2 | Example 3 | Example 4 |
|---|---|---|---|---|---|
| Figure illustrating basic shape of tread part | FIG. 7 | FIG. 1 | FIG. 1 | FIG. 1 | FIG. 1 |
| Presence or absence of first slots and second slots | — | Both are present | Only first slots are present | Both are present | Both are present |
| Ra/Wm | — | 0.23 | 0.23 | 0.18 | 0.20 |
| Da/D1 | 0.43 | 0.43 | 0.43 | 0.43 | 0.43 |
| Wb1/Wm | 0.05 | 0.05 | 0.05 | 0.05 | 0.05 |
| Wb1/La | 0.14 | 0.14 | 0.14 | 0.14 | 0.14 |
| Db/D1 | 0.10 | 0.10 | 0.10 | 0.10 | 0.10 |
| Braking performance on wet road [Index number; larger value indicates better performance] | 100 | 110 | 108 | 111 | 110 |
| Skid resistance on wet road [Index number; larger value indicates larger resistance] | 100 | 110 | 108 | 106 | 109 |
| Uneven wear resistance [Index number; larger value indicates larger resistance] | 100 | 110 | 108 | 111 | 110 |

|  | Example 5 | Example 6 | Example 7 | Example 8 | Example 9 | Example 10 |
|---|---|---|---|---|---|---|
| Figure illustrating basic shape of tread part | FIG. 1 | FIG. 1 | FIG. 1 | FIG. 1 | FIG. 1 | FIG. 1 |
| Presence or absence of first slots and second slots | Both are present | Both are present | Both are present | Both are present | Both are present | Both are present |
| Ra/Wm | 0.26 | 0.28 | 0.23 | 0.23 | 0.23 | 0.23 |
| Da/D1 | 0.43 | 0.43 | 0.38 | 0.40 | 0.46 | 0.48 |
| Wb1/Wm | 0.05 | 0.05 | 0.05 | 0.05 | 0.05 | 0.05 |
| Wb1/La | 0.14 | 0.14 | 0.14 | 0.14 | 0.14 | 0.14 |
| Db/D1 | 0.10 | 0.10 | 0.10 | 0.10 | 0.10 | 0.10 |
| Braking performance on wet road [Index number; larger value indicates better performance] | 109 | 108 | 110 | 110 | 110 | 112 |
| Skid resistance on wet road [Index number; larger value indicates larger resistance] | 111 | 112 | 109 | 110 | 110 | 110 |
| Uneven wear resistance [Index number; larger value indicates larger resistance] | 108 | 107 | 108 | 109 | 108 | 106 |

|  | Example 11 | Example 12 | Example 13 | Example 14 | Example 15 | Example 16 |
|---|---|---|---|---|---|---|
| Figure illustrating basic shape of tread part | FIG. 1 | FIG. 1 | FIG. 1 | FIG. 1 | FIG. 1 | FIG. 1 |
| Presence or absence of first slots and second slots | Both are present | Both are present | Both are present | Both are present | Both are present | Both are present |
| Ra/Wm | 0.23 | 0.23 | 0.23 | 0.23 | 0.23 | 0.23 |
| Da/D1 | 0.43 | 0.43 | 0.43 | 0.43 | 0.43 | 0.43 |
| Wb1/Wm | 0.03 | 0.04 | 0.06 | 0.08 | 0.05 | 0.05 |
| Wb1/La | 0.14 | 0.14 | 0.14 | 0.14 | 0.08 | 0.10 |

TABLE 1-continued

|  | | | | | | |
|---|---|---|---|---|---|---|
| Db/D1 | 0.10 | 0.10 | 0.10 | 0.10 | 0.10 | 0.10 |
| Braking performance on wet road [Index number; larger value indicates better performance] | 110 | 110 | 110 | 112 | 110 | 110 |
| Skid resistance on wet road [Index number; larger value indicates larger resistance] | 110 | 110 | 110 | 110 | 112 | 110 |
| Uneven wear resistance [Index number; larger value indicates larger resistance] | 108 | 109 | 108 | 106 | 106 | 108 |

|  | Example 17 | Example 18 | Example 19 | Example 20 | Example 21 | Example 22 |
|---|---|---|---|---|---|---|
| Figure illustrating basic shape of tread part | FIG. 1 | FIG. 1 | FIG. 1 | FIG. 1 | FIG. 1 | FIG. 1 |
| Presence or absence of first slots and second slots | Both are present | Both are present | Both are present | Both are present | Both are present | Both are present |
| Ra/Wm | 0.23 | 0.23 | 0.23 | 0.23 | 0.23 | 0.23 |
| Da/D1 | 0.43 | 0.43 | 0.43 | 0.43 | 0.43 | 0.43 |
| Wb1/Wm | 0.05 | 0.05 | 0.05 | 0.05 | 0.05 | 0.05 |
| Wb1/La | 0.17 | 0.20 | 0.14 | 0.14 | 0.14 | 0.14 |
| Db/D1 | 0.10 | 0.10 | 0.04 | 0.05 | 0.14 | 0.15 |
| Braking performance on wet road [Index number; larger value indicates better performance] | 110 | 110 | 110 | 110 | 110 | 112 |
| Skid resistance on wet road [Index number; larger value indicates larger resistance] | 108 | 106 | 109 | 110 | 110 | 110 |
| Uneven wear resistance [Index number; larger value indicates larger resistance] | 110 | 112 | 108 | 109 | 108 | 106 |

A result of the tests can confirm that various performances of tires of examples improve in a well-balanced manner as compared to tires of conventional examples and comparative examples. Further, tests are performed by varying a tire size or a width of the middle land portions within preferred ranges, and the result is the same as this test result.

A tire may have groove-like bodies each having a small width in land portions of a tread part. Such groove-like bodies increase a frictional force by scratching a wet road surface with opening edges thereof. Tire axial direction components of the opening edges increase braking performance on a wet road. Tire circumferential direction components of the opening edges increase skid resistance during turning on a wet road. Therefore, a tire formed with groove-like bodies has excellent wet performance.

However, for a tire of this kind, since rigidity of the land portions is reduced, there is a problem that uneven wear resistance is likely to deteriorate such as that punching wear starting from the groove-like bodies is promoted.

A tire according to an embodiment of the present invention improves wet performance and uneven wear resistance in a well-balanced manner.

A tire according to an embodiment of the present invention includes a tread part in which multiple main grooves that each continuously extend in a tire circumferential direction, and land portions that are demarcated by the main grooves are formed. Slots that are recessed from a tread surface are formed in each of the land portions. The slots each extend in a curved manner from a first end to a second end forming an arc shape. An opening edge of each of the slots on the tread surface forms a crescent shape that is gradually increased in width from the first end and the second end toward a longitudinal direction central portion of the each of the slots.

In a tire according to an embodiment of the present invention, it is desirable that the slots be each curved so as to project in a tire axial direction.

In a tire according to an embodiment of to the present invention, it is desirable that the slots include: first slots that are convex toward one side of the tire axial direction; and second slots that are convex toward an opposite direction to the first slots, and the first slot and the second slots be alternately formed in the tire circumferential direction.

In a tire according to an embodiment of the present invention, it is desirable that the opening edge include a first arc-shaped edge and a second arc-shaped edge that each extend in an arc shape between the first end and the second end, the slots each include a first portion on the first arc-shaped edge side and a second portion on the second arc-shaped edge side, and the first portion have a larger depth than the second portion.

In a tire according to an embodiment of the present invention, it is desirable that a width of the first portion in a direction orthogonal to the first arc-shaped edge be smaller than a width of a portion of the second portion orthogonal to the second arc-shaped edge.

In a tire according to an embodiment of the present invention, it is desirable that the first portion have a width of 0.2-1 mm in a region on a tire radial direction inner side of the second portion.

In a tire according to an embodiment of the present invention, it is desirable that the first arc-shaped edge have a larger curvature radius than the second arc-shaped edge.

In a tire according to an embodiment of the present invention, it is desirable that the curvature radius of the first arc-shaped edge be 0.20-0.26 times a tire axial direction width of each of the land portions.

In a tire according to an embodiment of the present invention, it is desirable that a depth of the first portion be 0.40-0.46 times a groove depth of each of the main grooves.

In a tire according to an embodiment of the present invention, it is desirable that a maximum width of the second portion be 0.04-0.06 times a tire axial direction width of each of the land portions, and be 0.10-0.17 times a length between the first end and the second end of each of the slots.

In a tire according to an embodiment of the present invention, it is desirable that a groove depth of the second portion be 0.09-0.1 times the groove depth of each of the main grooves.

In a tire according to an embodiment of the present invention, it is desirable that the main grooves include crown main grooves on a tire equator side and shoulder main grooves that are formed on tire axial direction outer sides of the crown main grooves, the land portions include middle land portions that are demarcated by the crown main grooves and the shoulder main grooves, and the slots be formed in the middle land portions.

In a tire according to an embodiment of the present invention, it is desirable that the middle land portions be each formed with multiple middle sipes that connect one of the shoulder main grooves and one of the crown main grooves, and the middle sipes each include a first sipe portion that extends from one of the shoulder main grooves toward one of the crown main grooves and is inclined to one side with respect to the tire axial direction, and a second sipe portion that connects the first sipe portion and the one of the crown main grooves and is inclined in an opposite direction to the first sipe portion.

In a tire according to an embodiment of the present invention, it is desirable that the middle land portions be each formed with multiple middle sipes that connect one of the shoulder main grooves and one of the crown main grooves, and the middle sipes each extend from one of the shoulder main grooves toward one of the crown main grooves and be inclined to one side with respect to the tire axial direction.

In the tread part of a tire according to an embodiment of the present invention, the multiple main grooves that each continuously extend in the tire circumferential direction and the land portions that are demarcated by the main grooves are formed. In each of the land portions, the slots that are recessed from the tread surface are formed. The slots each extend in a curved manner from the first end to the second end forming an arc shape. The opening edges of the slots on the tread surface each have a tire axial direction component and a tire circumferential direction component. Therefore, the slots increase braking performance and skid resistance on a wet road and improve wet performance. Further, the opening edges of the slots that are each curved in an arc shape can disperse a load acting on the land portions in multiple directions and thus, an apparent rigidity of the land portions can be increased. Therefore, occurrence of punching wear or the like can be suppressed.

Further, the opening edge of each of the slots forms a crescent shape that is gradually increased in width from the first end and the second end toward a longitudinal direction central portion of the each of the slots. Opening edges on two sides of each of such slots have different curvature radii and thus can further disperse the above-described load in multiple directions. Therefore, occurrence of punching wear or the like can be further suppressed.

Therefore, a tire according to an embodiment of the present invention allows wet performance and uneven wear resistance to be improved in a well-balanced manner.

Obviously, numerous modifications and variations of the present invention are possible in light of the above teachings. It is therefore to be understood that within the scope of the appended claims, the invention may be practiced otherwise than as specifically described herein.

The invention claimed is:

1. A tire, comprising:
a tread part having a plurality of main grooves each continuously extending in a tire circumferential direction, and a plurality of land portions demarcated by the main grooves,
wherein the tread part has a tread surface, each of the land portions has a plurality of slots formed such that each of the slots is recessed from the tread surface and extending from a first end to a second end in a curve forming an arc shape, each of the slots has an opening edge on the tread surface such that the opening edge is forming a crescent shape that is gradually increased in width from the first end and the second end toward a longitudinal direction central portion of each of the slots, the plurality of slots includes a plurality of first slots and a plurality of second slots formed such that the first slots are convex toward one side of a tire axial direction, that the second slots are convex toward an opposite direction with respect to the first slots and that the first slots and the second slots are alternately formed in the tire circumferential direction.

2. The tire according to claim 1, wherein the plurality of slots is formed such that the opening edge has a first arc-shaped edge and a second arc-shaped edge each extending in the arc shape between the first end and the second end and that each of the slots includes a first portion on a first arc-shaped edge side and a second portion on a second arc-shaped edge side, and each of the slots is formed such that the first portion has a depth that is greater than a depth of the second portion.

3. The tire according to claim 2, wherein each of the slots is formed such that a width of the first portion in a direction orthogonal to the first arc-shaped edge is smaller than a width of a portion of the second portion orthogonal to the second arc-shaped edge.

4. The tire according to claim 2, wherein each of the slots is formed such that the first portion has a width in a range of 0.2 to 1 mm in a region on a tire radial direction inner side of the second portion.

5. The tire according to claim 2, wherein each of the slots is formed such that the first arc-shaped edge has a curvature radius that is larger than a curvature radius of the second arc-shaped edge.

6. The tire according to claim 5, wherein each of the slots is formed such that the curvature radius of the first arc-shaped edge is in a range of 0.20 to 0.26 times a tire axial direction width of each of the land portions.

7. The tire according to claim 2, wherein each of the slots is formed such that the depth of the first portion is in a range of 0.40 to 0.46 times a groove depth of each of the main grooves.

8. The tire according to claim 2, wherein each of the slots is formed such that a maximum width of the second portion is in a range of 0.04 to 0.06 times a tire axial direction width of each of the land portions, and is in a range of 0.10 to 0.17 times a length between the first end and the second end of each of the slots.

9. The tire according to claim 7, wherein each of the slots is formed such that the depth of the second portion is in a range of 0.09 to 0.1 times the groove depth of each of the main grooves.

10. The tire according to claim 1, wherein the plurality of main grooves includes a plurality of crown main grooves on a tire equator side and a plurality of shoulder main grooves formed on tire axial direction outer sides of the crown main grooves, the plurality of land portions includes a plurality of middle land portions demarcated by the crown main grooves and the shoulder main grooves, and the plurality of slots is formed in the middle land portions.

11. The tire according to claim 10, wherein each of the middle land portions has a plurality of middle sipes connecting one of the shoulder main grooves and one of the crown main grooves, and each of the middle sipes includes a first sipe portion and a second sipe portion formed such that the first sipe portion is extending from one of the shoulder main grooves toward one of the crown main grooves and inclined to one side with respect to the tire axial direction and that the second sipe portion is connecting the first sipe portion and the one of the crown main grooves and inclined in an opposite direction with respect to the first sipe portion.

12. The tire according to claim 10, wherein each of the middle land portions has a plurality of middle sipes connecting one of the shoulder main grooves and one of the crown main grooves, and the plurality of middle sipes is formed such that each of the middle sipes is extending from one of the shoulder main grooves toward one of the crown main grooves and inclined to one side with respect to the tire axial direction.

13. The tire according to claim 10, wherein the plurality of slots is formed such that the opening edge has a first arc-shaped edge and a second arc-shaped edge each extending in the arc shape between the first end and the second end and that each of the slots includes a first portion on a first arc-shaped edge side and a second portion on a second arc-shaped edge side, and each of the slots is formed such that the first portion has a depth that is greater than a depth of the second portion.

14. The tire according to claim 13, wherein each of the slots is formed such that a width of the first portion in a direction orthogonal to the first arc-shaped edge is smaller than a width of a portion of the second portion orthogonal to the second arc-shaped edge.

15. The tire according to claim 3, wherein each of the slots is formed such that the first portion has a width in a range of 0.2 to 1 mm in a region on a tire radial direction inner side of the second portion.

16. The tire according to claim 3, wherein each of the slots is formed such that the first arc-shaped edge has a curvature radius that is larger than a curvature radius of the second arc-shaped edge.

17. The tire according to claim 16, wherein each of the slots is formed such that the curvature radius of the first arc-shaped edge is in a range of 0.20 to 0.26 times a tire axial direction width of each of the land portions.

18. A tire, comprising:
a tread part having a plurality of main grooves each continuously extending in a tire circumferential direction, and a plurality of land portions demarcated by the main grooves,
wherein the tread part has a tread surface, each of the land portions has a plurality of slots formed such that each of the slots is recessed from the tread surface and extending from a first end to a second end in a curve forming an arc shape, each of the slots has an opening edge on the tread surface such that the opening edge is forming a crescent shape that is gradually increased in width from the first end and the second end toward a longitudinal direction central portion of each of the slots, the plurality of slots is formed such that the opening edge has a first arc-shaped edge and a second arc-shaped edge each extending in the arc shape between the first end and the second end and that each of the slots includes a first portion on a first arc-shaped edge side and a second portion on a second arc-shaped edge side, and each of the slots is formed such that the first portion has a depth that is greater than a depth of the second portion.

19. The tire according to claim 18, wherein each of the slots is formed such that a width of the first portion in a direction orthogonal to the first arc-shaped edge is smaller than a width of a portion of the second portion orthogonal to the second arc-shaped edge.

20. The tire according to claim 18, wherein each of the slots is formed such that the first portion has a width in a range of 0.2 to 1 mm in a region on a tire radial direction inner side of the second portion.

* * * * *